United States Patent [19]
Schubach

[11] 3,868,802
[45] Mar. 4, 1975

[54] FLUSH JOINT STRUCTURE FOR ADJOINING PANELS

[75] Inventor: Theodor C. Schubach, Bonita, Calif.

[73] Assignees: Rohr Industries Inc., Chula Vista, Canada; Rohr Industries, Inc., Chula Vista, Calif.

[22] Filed: Oct. 11, 1972

[21] Appl. No.: 296,517

[52] U.S. Cl. ................................. 52/471, 52/588
[51] Int. Cl. .......................... E04c 1/10, E04c 2/08
[58] Field of Search 287/20.92 J, 20.92 W, 20.92 G, 287/20.92 R; 52/588, 483, 599, 463, 468, 492, 753 G, 753 J, 753 R, 753 W

[56] References Cited
UNITED STATES PATENTS

| 2,478,993 | 8/1949 | Wing | 52/483 |
| 2,481,350 | 9/1949 | Rosenberg | 287/20.92 R |
| 3,057,444 | 10/1962 | Walberg | 52/459 |
| 3,368,315 | 2/1968 | Thurnau | 52/588 |
| 3,604,168 | 9/1971 | Meineke | 52/463 |
| 3,708,938 | 1/1973 | Tantlinger | 52/588 |

FOREIGN PATENTS OR APPLICATIONS

| 1,216,137 | 11/1959 | France | 52/463 |
| 856,841 | 12/1960 | Great Britain | 287/20.92 R |
| 259,198 | 4/1967 | Austria | 52/588 |

*Primary Examiner*—Jordon Franklin
*Assistant Examiner*—Conrad L. Berman
*Attorney, Agent, or Firm*—Patrick J. Schlesinger

[57] ABSTRACT

A plurality of structural panels are mounted in side by side relation on a structural support member, adjacent edges of the panels being provided with overlapping flanges which hold the panels in spaced relation to provide a channel therebetween and permit the insertion of fasteners, which secure the flanges, and thereby the panels, to the support member. A latch step is provided along each of the panel edges which define each channel, and a recess is provided along each exposed panel edge along each side of the channel to receive an edge of a flush plate, which spans, and closes, the channel between adjacent panels. Two latch flanges or fingers extend from the underside of each flush plate into the channel which it covers, for latching engagement, one with each of the latch steps. Each flush plate is applied by pressing it into flush latched position, and can be removed by splitting it lengthwise with a suitable tool, such as a metal cutting saw.

4 Claims, 1 Drawing Figure

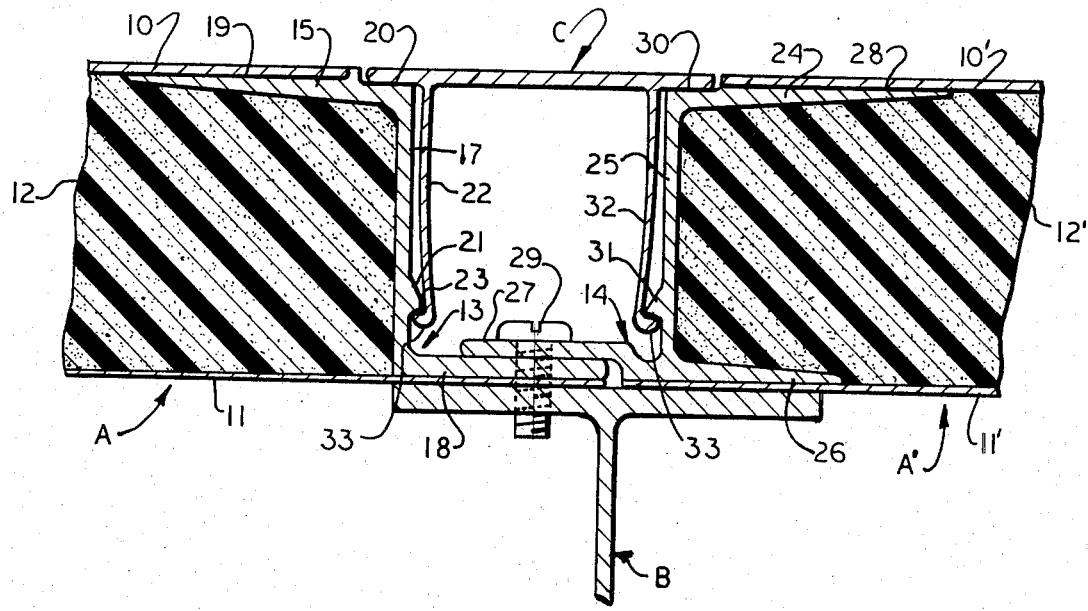

FLUSH JOINT STRUCTURE FOR ADJOINING PANELS

BACKGROUND OF THE INVENTION

In the past, it has been customary when fitting a flush plate to cover and conceal a row of screws or other fasteners set in a channel or other recess, to fit the flush plate into recesses provided one along each edge of the recess, and then to secure the flush plate in position by two rows of blind fasteners, one along each edge of the flush plate. While such flush plates are satisfactory in many respects, the preparation and insertion of the blind fasteners, and their removal when it becomes necessary to remove the flush plate, involves a considerable amount of labor, which adds substantially to cost and may detract from appearance.

PURPOSE OF THE INVENTION

A primary objective of the present invention is to make a simple, flush joint for joining two load bearing panels, which can be easily and quickly installed or removed with a minimum of parts and labor.

A further objective of the invention is to provide a flush joint for joining in edge to edge relation two load bearing panels provided on adjacent edges thereof with overlapping flanges.

BRIEF DESCRIPTION OF THE DRAWING

The foregoing and other objectives and advantages of the invention will be apparent from the following description and the accompanying drawing, wherein the single FIGURE of the drawing shows a vertical, transverse sectional view of fragments of a pair of floor panels supported by a structural member and connected by a joint incorporating the present invention.

DETAILED DESCRIPTION OF THE DRAWING

Referring to the drawing in detail, a joined pair of insulated panels A and A', which are here illustrated as of a type for use in the floor of a transportation type vehicle such as a bus or rail car, are supported along their zone of juncture by an underlying structural support member B.

The floor panels A and A' are similar, the right hand edge portion of the panel A, and left hand edge portion of the panel A' being shown. Since the panels are similar, the same reference numerals are applied to corresponding parts of both panels, those for the right hand panels B having the prime (') added. Each of the panels has top and bottom facing sheets 10 and 11, respectively, and a core 12 of suitable structural insulative material such as a hard type polypropylene foam. Other suitable materials, such as, for example, metal covered plywood or conventional honeycomb panel may be used if desired.

Each floor panel A and A' has a first edge member 13 incorporated in one edge thereof, and a second edge member 14 incorporated in its opposite edge, the edge members 13 and 14 preferably being aluminum extrusions.

The first edge member 13 is of generally Z cross sectional shape, and comprises an upper flange 15, a medial flange 17 substantially perpendicular thereto, and a lower flange 18, generally parallel to the upper flange 15. The upper flange 15 has a first recess 19 therein to receive a flat, marginal portion of the upper facing sheet 10 flush therein, and a second recess 20 for receiving in flush, supported relation a marginal portion of a flush plate C to be referred to in greater detail later herein.

The medial flange 17 has a latch step 21 formed on the outward side thereof, the upper side of each latch step sloping downwardly at an angle suitable to cam a latch finger 22 on the flush plate C inwardly during the pressing home of the flush plate, the lower side of each latch step being shaped to have latching engagement with a latch detent 23 in its associated latch finger.

The underside of the lower flange 18 of each edge member 13 is parallel to the bottom of the recess 19 in the upper flange 15 and rests flat on the bottom facing sheet 11. The contacting surfaces of each edge member 13 and the facing sheets 10 and 11 are bonded together by suitable means, such as, for example, bonding resin, many of which are well known and readily available.

The other edge member 14 of each panel is of channel shape, with its open side facing laterally inwardly, and comprises an upper flange 24, and upright medial flange 25 and a lower flange 26. An upwardly offset flange 27 also extends laterally outwardly from the lower channel flange 26. Each upper flange 24 has its upper surface 28 formed to receive the opposite marginal portion of each upper facing sheet 10 level with the first edge portion seated in the recess 19 of edge member 13, and a depression 30 is also provided in the top of edge member 14 to receive flush therein the opposite edge of a flush plate C therein.

A latch step 31, similar to the latch step 21 described previously herein, is provided on the medial flange 25 to engage a second latch finger 32 provided on the flush plate C.

The under surface of the lower channel flange 26 is flat, and parallel to the surface comprising the bottom of the recess 28. The upper and lower facing sheets 10 and 11 are fitted and bonded to each edge member 14, for example, as mentioned previously herein for the edge member 13.

The offset flange 27 on each edge member 14 is of substantially the same width as the lower flange 18 of the edge member 13, and is offset upwardly from the plane defined by the bottom of the lower facing sheet 11 sufficiently to receive the lower flange 18 of the edge member 13 of an adjacent panel A in seated relation therebeneath, with the lower facing sheets of adjacent panels co-planar and mounted on a structural support member B.

Suitable fasteners, such as machine screws 29, secure the overlapping flanges 18 and 27 to the support member B and to each other.

Each flush plate C is of a width and marginal thickness to span the channel like space between adjacent panels A and A' and to seat flush in the flush plate recesses 20 and 30 provided in the edge members 13 and 14, respectively.

The latch fingers 22 and 32 preferably are formed during the extrusion of the flush plate C, and these latch fingers may either be left as continuous flanges throughout the length of the flush plate, or they may be slitted or notched out if desired to form narrower or intermittent fingers in an obvious manner.

The lower or free end of each latch finger 22 and 32 has a curved lower face 33 to ride on the sloping upper face of its associated latch step and thereby cam the latch finger inwardly to clear the latch step during the pressing home of the flush plate. Upon clearing the latch step, the latching finger springs outwardly for latching engagement of its detent with the under side of its respective latch step.

OPERATION OF THE ILLUSTRATIVE FORM OF THE INVENTION

With the required plurality of the floor panels A and A' made as illustrated, and described previously herein, structural support members B are provided at suitably spaced intervals to support adjoining edges of adjacent panels, such as the panels A and A' shown in the drawing. The panels are arranged as shown, the overlapping flanges 18 and 27 acting as spacers to space the panels at suitable intervals although suitable additional, conventional spacing means, not shown, may be employed if required to insure that the flush panels A and A' are properly positioned. Holes for the screws 29 may be either predrilled and threaded, or such drilling and threading may be done with the floor panels A and A' in place, as desired. The screws 29 are screwed in as shown and drawn down to specified torque.

Each flush plate C is then dropped into place and pressed down by the application of pressure to its exposed upper surface, the pressure being sufficient to cam the curved lower ends 33 of the latch fingers 22 and 32 inwardly toward each other until they clear the latch steps 21 and 31, whereupon the latch fingers spring apart to their latching position illustrated in the drawing. Obviously, where the latch fingers 22 and 32 are integral parts of the flush plate C a material must be used which is at least slightly springy.

Under ordinary conditions it is not contemplated that the flush plate C will be removed during the life of a structure in which it is incorporated. If, however, it should become necessary or desirable to remove the flush plate, such removal may be readily accomplished by splitting the plate lengthwise between the latch fingers, as by means of a conventional metal cutting saw. When reassembling the structure, a new, similar flush plate will be applied in the manner described previously herein.

The invention provides a simple, strong, easily assembled joint structure, which after the driving of the screws 29, is closed off by the flush plate C without the use of extraneous fasteners to provide a flush, all over surface which is well adopted to receive various types of floor covering, such as carpet, linoleum or other suitable material.

Having thus described the invention, what is claimed as new and useful and desired to be secured by U.S. Letters Patent is:

1. A concealed flush joint structure comprising in combination with two generally similar structural floor panels mounted in edge-to-edge relation on an underlying supporting member to define a common upper surface, adjacent edge faces of said first and second panels spaced slightly apart, and parallel, each of the panels having a marginal recess in an upper face thereof along its respective adjacent edge to receive the edge of a cover plate flush therein, each panel further comprising a parallel bottom facing sheet, a first of said adjacent edge faces comprising an edge member of said first panel, of general Z cross sectional shape having an upper flange portion bonded to an underside marginal portion of a top facing sheet of said first panel and a bottom flange portion bonded to an upper side of a bottom facing sheet marginal portion of said first panel wherein said bottom flange portion projects outwardly in the direction of the adjacent floor panel, a second of said adjacent edge faces comprising an edge member of said second panel of general channel cross sectional shape having an upper flange portion bonded to an underside marginal portion of a top facing sheet of said second panel and a lower flange portion bonded to an upper side of a substantially continuous bottom facing sheet with the open side of the channel facing laterally inwardly toward the interior of said second panel, a flange projecting from the lower side of each second edge member and in relative overlapping engagement with the projecting flange from said one edge of the adjoining panel, the overlapping flanges holding the edge faces of the panels thereabove in spaced, parallel relation, a core of light, structural material having high thermal and acoustical insulative properties filling the space interiorly of the facing sheets and edge members and bonded to said sheets and edge members, a first latch step along the exterior face of the intermediate portion of the Z-shape of the first edge member, a second latch step along the exterior face of the intermediate portion of the second edge member, a plurality of fasteners penetrating the overlapping flange portions of the first and second edge members and the bottom facing sheet of said first panel, and directly connecting the same to said underlying supporting member, an extruded cover plate having load bearing structural integrity permanently flush fitted to and supported on said oppositely disposed upper marginal portions of the adjoining pair of panels to span the space therebetween, and a pair of elongated latch fingers extending downwardly from the lower face of said flush plate, each latch finger being shaped and being in latching engagement with one of said latch steps when the plate is seated flush on such upper marginal panel portions.

2. A joint structure according to claim 1 wherein each panel comprises a top and bottom facing sheet, a pair of edge members fixedly secured between opposite edge portions of the facing sheets, and a filling of structural plastic foam.

3. A permanent, concealed, flush joint structure comprising, in combination with two generally similar structural floor panels having upper and lower facing sheets bonded thereto, wherein said panels are supported in side-by-side relation to an underlying support member to define a common outer surface, an edge face of each panel spaced slightly from, and parallel to the adjacent edge of the other panel, each of the panels having a recess in its outer surface along its edge to receive an edge portion of a cover plate flush therein, a flange projecting from the edge face of each of said panels and extending toward the edge face of the other panel, said flanges being spaced inwardly from a common upper surface defined by the panels, and in overlapping, closely superimposed relation with each other, means directly securing together the overlapping flanges, the substantially continuous lower facing sheets the underlying support member, and thereby the two panels, a latch element on each of the edge faces of the two panels, each of said latch elements being spaced inwardly from such outer surface defined by the panels adjacent parallel edges, an extruded joint cover plate having load bearing structural integrity spanning the space between the parallel edge faces of the two panels and permanently fitted flush into and seated upon the oppositely disposed marginal recesses provided in the two panels, a pair of substantially parallel and elongated latch fingers extending inwardly from the inner face of said joint cover and fitted between the parallel edge faces of the two panel members, each latch finger having a cam end face and a latch portion in latching engagement with one of said latch elements.

4. A joint structure according to claim 3 wherein each panel comprises an upper and lower facing sheet, a pair of edge members fixedly secured between opposite edge portions of the facing sheets, and a filling of structural plastic foam.

* * * * *